Feb. 28, 1967  L. I. BERENS  3,306,264
ANIMAL RUBBING AND OILING APPARATUS
Filed Oct. 18, 1965  2 Sheets-Sheet 1
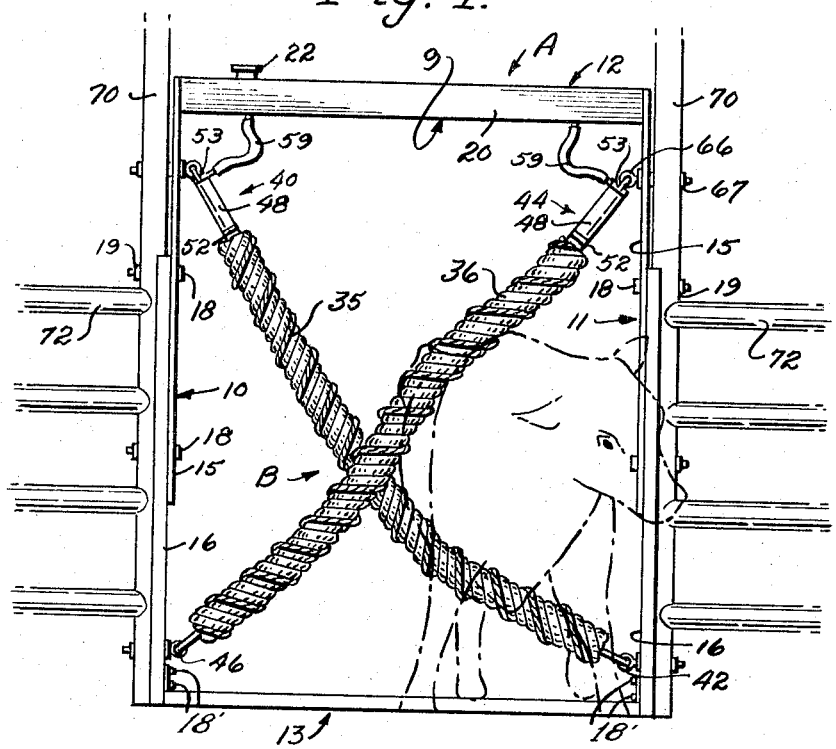
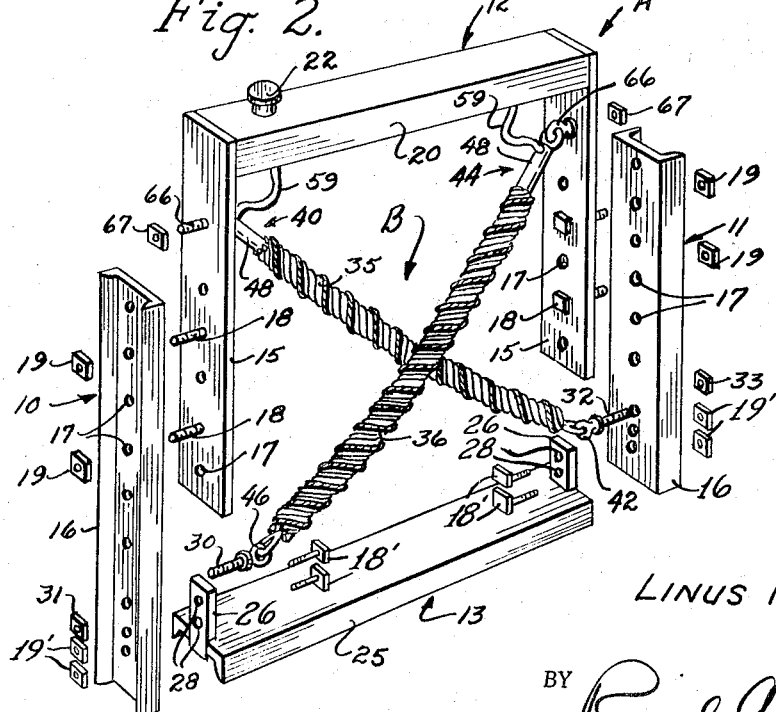
INVENTOR
LINUS I. BERENS
BY Rommel, Allen & Rommel
ATTORNEYS

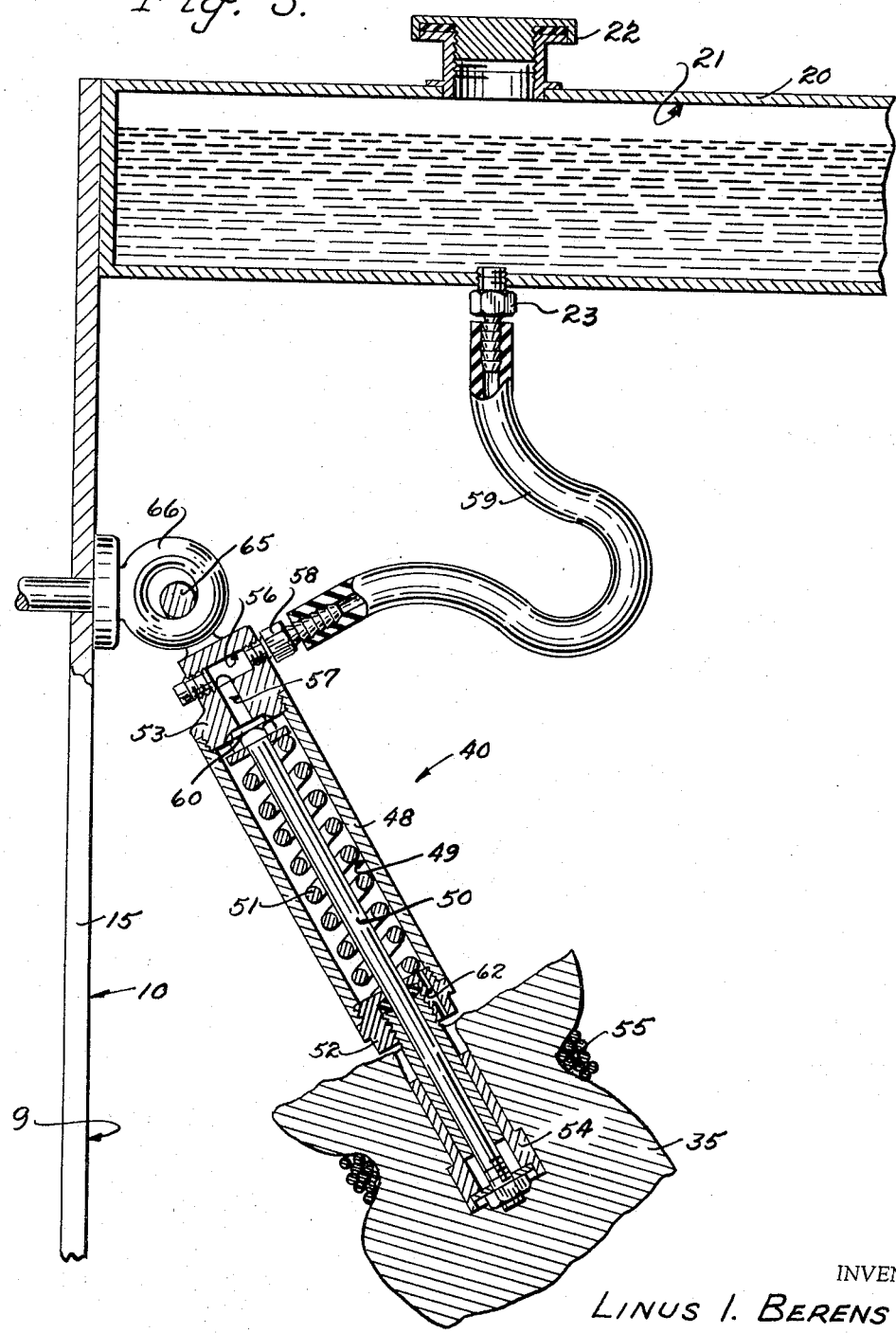

United States Patent Office 3,306,264
Patented Feb. 28, 1967

3,306,264
ANIMAL RUBBING AND OILING APPARATUS
Linus I. Berens, Box 655, Rte. 7, Tallahassee, Fla. 32301
Filed Oct. 18, 1965, Ser. No. 496,873
5 Claims. (Cl. 119—157)

This invention relates to improvements in animal rubbing and oiling apparatus.

Previously provided animal rubbing and oiling apparatus have been designed so that only a very limited portion of the animal's hide will be rubbed and oiled at any one time. The primary object of my invention is the provision of animal rubbing and oiling apparatus which will serve to rub and oil a large area of the head, neck, back, side, legs and belly of the animal at the same time, in a single pass against the rubbing and oiling members.

A further object is the provision of animal rubbing and oiling apparatus which is particularly suitable for mounting in gateways, doorways and the like, arranged in such a manner that each passage of an animal through the doorway will serve to rub and oil a large area of the head, neck, back, side, legs and belly of the animal.

A further object of the invention is the provision of improved animal rubbing and oiling apparatus having an oil reservoir and valve means which is operated solely by the rubbing of the animal against the apparatus, thus preventing any waste of the oil when the apparatus is not actually being used by an animal.

Other objects and advantages of the invention will be apparent during the course of the following detailed description of the invention, taken in connection with the accompanying drawings, forming a part of this specification, and in which drawings:

FIG. 1 is a front elevation of the apparatus, showing the same mounted in a gateway or doorway and illustrating how an animal will, upon a single pass, have a large area of its head, neck, back, side, legs and belly rubbed and oiled in one pass through the apparatus.

FIG. 2 is an exploded perspective view of the apparatus.

FIG. 3 is an enlarged fragmentary sectional view illustrating the improved oil feed characteristics of my invention.

In the drawings, wherein for the purpose of illustration is shown a preferred embodiment of the invention, and wherein similar reference characters designate corresponding parts throughout the several views, the letter A may generally designate the frame of my improved animal rubbing and oiling apparatus, and B the catenary rubbing and oiling means thereof.

As shown in FIG. 1, the apparatus has been primarily developed for rubbing and oiling of cattle, but it is obvious that the same may be used in connection with other animals as well.

Frame A is preferably of a polygonal shape, having an opening 9 for passageway of an animal therethrough, and including a pair of spaced apart substantially vertical side portions 10 and 11, a substantially horizontal upper portion 12 and a substantially horizontal base portion 13.

Each substantially vertical side portions 10 and 11 preferably includes elongated side frame members 15 and 16, each being provided with a plurality of spaced apart openings 17 in juxtaposition so that the same may be connected together, as a single unit, by such as bolts 18 and nuts 19, providing a vertically extending side portion of the desired length.

Horizontal upper portion 12 preferably includes an elongated oil reservoir 20 having an oil receiving chamber 21, filler cap member 22, and oil outlet conduit 23. As shown, one end of oil reservoir 20 is preferably welded or otherwise secured to side frame member 15 of side portion 10, and the other end of oil reservoir 20 is preferably welded or otherwise attached to side frame member 15 of side portion 11.

Horizontal lower portion 13 preferably includes an elongated base plate 25 having an upstanding flange portion 26 at each end thereof. Each upstanding flange portion 26 is preferably provided with apertures 28, flanges 26 being attached to elongated side members 16 of side portion 10 such as by bolt members 18' and nuts 19'.

Catenary rubbing and oiling means B preferably comprises a pair of elongated flexible members 35 and 36 which are positioned and attached to frame A in juxtaposition to cross one another in substantially x-like formation and dividing opening 9 of frame A into four quadrants, an upper, lower and a pair of side quadrants. As shown, elongated flexible members 35 and 36 preferably comprise wire bound rope, but it is obvious that any suitable form of elongated rubbing and oiling members might be used.

The upper end of elongated flexible member 35 is preferably pivotally attached to frame A adjacent the uppermost end of side portion 10 by connector means 40, extends diagonally across opening 9, and the opposite end thereof is pivotally attached adjacent the lowermost end of side portion 11 by ring 42 of a connector means which preferably comprises bolt member 32 and nut 33. The upper end of elongated flexible member 36 is preferably pivotally attached to frame A adjacent the uppermost end of side portion 11 by connector means 44, extends diagonally across opening 9, and the opposite end thereof is pivotally attached adjacent the lowermost end of side portion 10 by ring 46 of a connector means which preferably comprises bolt member 30 and nut 31.

Each elongated flexible member 35 and 36 is permitted to assume the form of a catenary curve between its attachment to the side frames at each end thereof and the catenary curves thereof criss-cross substantially centrally of the opening 9 of frame A at a height to inhibit animal passage through each the upper and lower quadrants. Openings 17 comprise connector receiving means for receiving bolt members 30 and 32 so that the angle of diagonal extension of flexible members 35 and 36 may be varied by selected connection therewith. Such angular variation of flexible members 35 and 36 permits variation in the height and width of the quadrants formed thereby according to the size of the animals it is desired to treat. As shown, each of the side quadrants will have the outer side thereof bound by a portion of one of the vertical side portions of frame A and the other sides thereof bound by a portion of each elongated flexible members 35 and 36, providing side triangular quadrants through which an animal may pass, and upon such passage, will have its head, neck, back, side, legs and belly rubbed and oiled by portions of elongated flexible members 35 and 36.

Connector means 40 and 44 each preferably comprise a valve member including a housing 48 having an elongated cylindrical chamber 49 which receives an elongated shaft 50 and a spring 51. A cap member 52 is provided on one end of housing 48 and a cap member 53 provided on the other end thereof. In an at-rest position, shaft 50 extends from adjacent cap 53 and passes through cap 52, shaft 50 being provided at its extended end with a mounting member 54 to which the upper end of an elongated flexible member is attached, such as by wire wrapping 55. Cap 53 preferably includes interconnecting passageways 56 and 57, a conduit 58 being attached to passageway 56 and receiving a conduit or hose 59 for supply of oil from oil reservoir 20 to passageway 56. The end of shaft 50 adjacent cap 53 is provided with a sealing member 60 which abuts against one end of passageway 57, the other end of passageway 57 opening into passageway 56.

When the elongated flexible members 35 and 36 are displaced, by rubbing of an animal thereagainst, shaft 50 of each valve member 40 and 44 will be pulled outwardly from chamber 49, against the expansion force of spring 51, and sealing member 60 will be pulled away from the opening of passageway 57, so that oil will be permitted to flow from oil reservoir 20, through conduit 59, to passageway 56, through passageway 57 to chamber 49, and from chamber 49 through passageway 62 of end cap 52, onto the uppermost portion of an elongated flexible member.

It will thus be seen that oil reservoir 20, valve housing 48 and the interconnecting members immediately hereinabove described comprise means for flowing oil onto the catenary scratching and oiling means B.

Cap 53 of each housing 48 is provided with a ring member 65 which is pivotally received within a ring bolt 66 which is secured in place by nut 67 to the uppermost portion of each side portion 10 and 11, for the respective valve members 40 and 44.

As shown in FIG. 1, bolt members 18, 30, 32 and 66 may be elongated and serve to suitably attach frame A to side members 70 of a gateway or doorway in a wall-like member 72.

Various changes may be made to the form of the invention herein shown and described without departing from the spirit of the invention or the scope of the following claims.

I claim:

1. Animal rubbing and oiling apparatus including a substantially polygonal upright frame having a substantially horizontal base member at the lower end thereof, a substantially horizontal upper member at the upper end thereof and a pair of substantially vertical spaced apart side members, and means for interconnecting the lower ends of said side members to said base member and the upper ends of said side members to said horizontal upper member in juxtaposition to provide a frame defining a substantially polygonal passageway of a vertical height and horizontal width to permit passage therethrough of an animal of the size for which the apparatus is designed; catenary rubbing means including a pair of elongated flexible members, first connector means for attaching one end of each said flexible member to said frame adjacent the upper end thereof, second connector means for attaching the opposite end of each said flexible member to said frame adjacent the lower end thereof, each flexible member having the upper end thereof interconnected to an opposite side of said frame from the upper end of the other and the lower end thereof interconnected to an opposite side of said frame from the lower end of the other, said flexible members extending diagonally across said passageway of said frame criss-crossing intermedially of said passageway in juxtaposition to divide the same into upper, lower, and a pair of side quadrants, each said side quadrant having one side thereof bound by a portion of said frame and the other sides thereof bound by a portion of each said flexible member and defining a confined animal passageway of a height and width so that the portion of said frame comprising one side of said side quadrants compels an animal of the size for which the apparatus is primarily designed to rub against and displace said flexible members from their normal catenary position in order to pass through said confined animal passageway; and oiling means comprising means for dispensing oil and other fluids for animal treatment onto said flexible members for dispersal to the hide of an animal as it rubs against said flexible members.

2. Animal rubbing and oiling apparatus as specified in claim 1 wherein said oiling means includes a fluid reservoir, said horizontal upper member including said reservoir, and each said first connector means comprises valve means operably connected between said reservoir and a flexible member for metering fluid from said reservoir to a flexible member upon displacement of said flexible members by an animal rubbing thereagainst.

3. Animal rubbing and oiling apparatus as specified in claim 1 wherein said frame includes a plurality of spaced connector receiving means for selective interconnection therewith of said second connector means and the angle of diagonal extension of said flexible members across said passageway of said frame is variable by interconnection of said second connector means with a selected connector receiving means.

4. Animal rubbing apparatus including a frame circumscribing an opening for the passage of animals of a given size therethrough, a pair of elongated flexible members of substantially diametrical cross section and having a substantially rough outer surface, means for interconnecting said pair of elongated flexible members to said frame with said flexible members criss-crossing substantially centrally of the opening circumscribed by said frame in juxtaposition to divide the opening circumscribed by said frame into four substantially triangular quadrants, each said quadrant having one side thereof bound by a portion of said frame and the other sides thereof bound by a portion of each said flexible members and defining a confined animal passageway of a height and width so that the portion of said frame comprising one side of each said quadrants compels an animal of the size for which the apparatus is primarily designed to rub against and displace said flexible members from their normal positions in order to pass through said confined animal passageway; and oiling means comprising means for dispensing oil and other fluids for animal treatment onto said flexible members for dispersal to the hide of an animal as it rubs against said flexible members.

5. Animal rubbing and oiling apparatus as specified in claim 4 wherein said oiling means includes a reservoir for storage of oil and other fluids for animal treatment and valve means operably connected between said reservoir and each flexible member for metering oil and other fluids for animal treatment from said reservoir onto a flexible member on displacement of said flexible members by an animal rubbing thereagainst.

References Cited by the Examiner

UNITED STATES PATENTS

| 2,632,063 | 3/1953 | Peterson | 119—159 |
| 2,697,415 | 12/1954 | Peterson | 119—159 |
| 2,912,961 | 11/1959 | Stark | 119—157 |
| 3,190,266 | 6/1965 | Malec | 119—157 |

SAMUEL KOREN, *Primary Examiner.*

HUGH R. CHAMBLEE, *Examiner.*